March 28, 1939.  J. W. TATTER  2,152,105
BRAKE
Original Filed Sept. 21, 1931  2 Sheets-Sheet 1
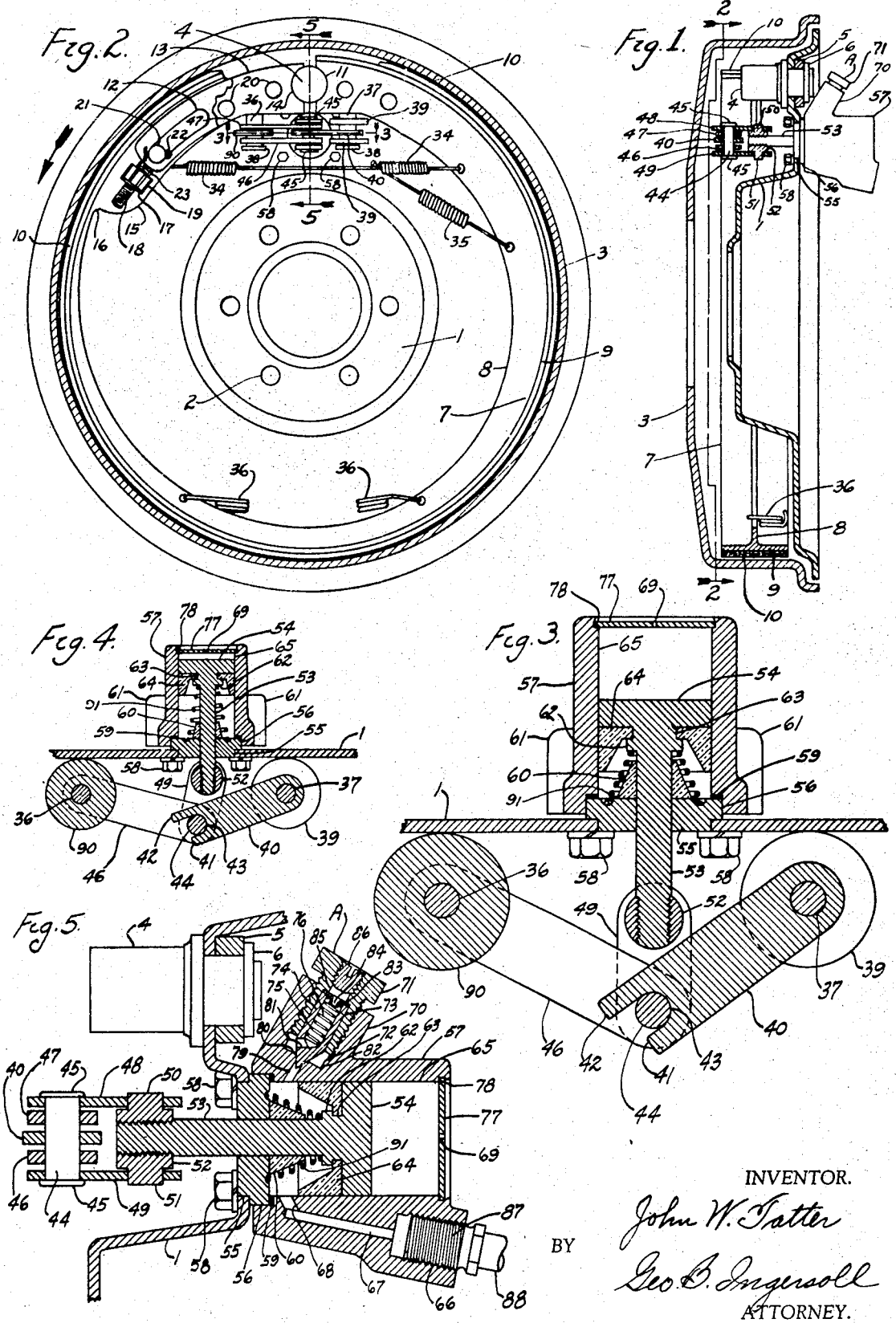
INVENTOR.
John W. Tatter
BY
Geo. B. Ingersoll
ATTORNEY.

March 28, 1939. J. W. TATTER 2,152,105
BRAKE
Original Filed Sept. 21, 1931 2 Sheets-Sheet 2

INVENTOR
John W. Tatter
BY George B. Ingersoll
ATTORNEY

Patented Mar. 28, 1939

2,152,105

UNITED STATES PATENT OFFICE 2,152,105

BRAKE

John W. Tatter, Akron, Ohio, assignor to Bendix Products Corporation, South Bend, Ind., a corporation of Indiana Substituted for abandoned application Serial No. 564,085, September 21, 1931. This application June 19, 1936, Serial No. 86,070

3 Claims. (Cl. 188—152)

This is a substitute for my abandoned application Serial No. 564,085, filed September 21, 1931.

My invention relates of improvements in brakes operated by hydraulic mechanism; and the objects of my improvement are, first, to provide hydraulic means for operating brakes normally operated by the usual type of mechanical means; second, to provide a hydraulic cylinder for mounting on the brake of a wheel, the longitudinal axis of the hydraulic cylinder extending in a plane approximately parallel with the axis of the wheel; third, to provide a hydraulic cylinder for a wheel brake, the hydraulic cylinder being mounted on the outside of the wheel brake mechanism; fourth, to provide a hydraulic cylinder connected to a leverage increasing mechanism located within the wheel brake of an automotive vehicle; fifth, to provide a hydraulic cylinder connected to a toggle mechanism for operating a wheel brake; sixth, to provide a brake having a shoe of T section gradually diminishing in cross sectional area; seventh, to provide a brake having swivel means connecting a hydraulic piston and a toggle means; eighth, to provide a brake shoe and a hydraulic cylinder oppositely disposed about a common support member; ninth, to provide a hydraulic cylinder having a frustro-conical shaped passage for receiving the hydraulic medium under pressure; and tenth, to provide a hydraulic cylinder outside of a brake drum, together with filling and bleeding means adjacent the hydraulic cylinder.

I attain these objects by the mechanism illustrated in the accompanying drawings, in which—

Figure 6:
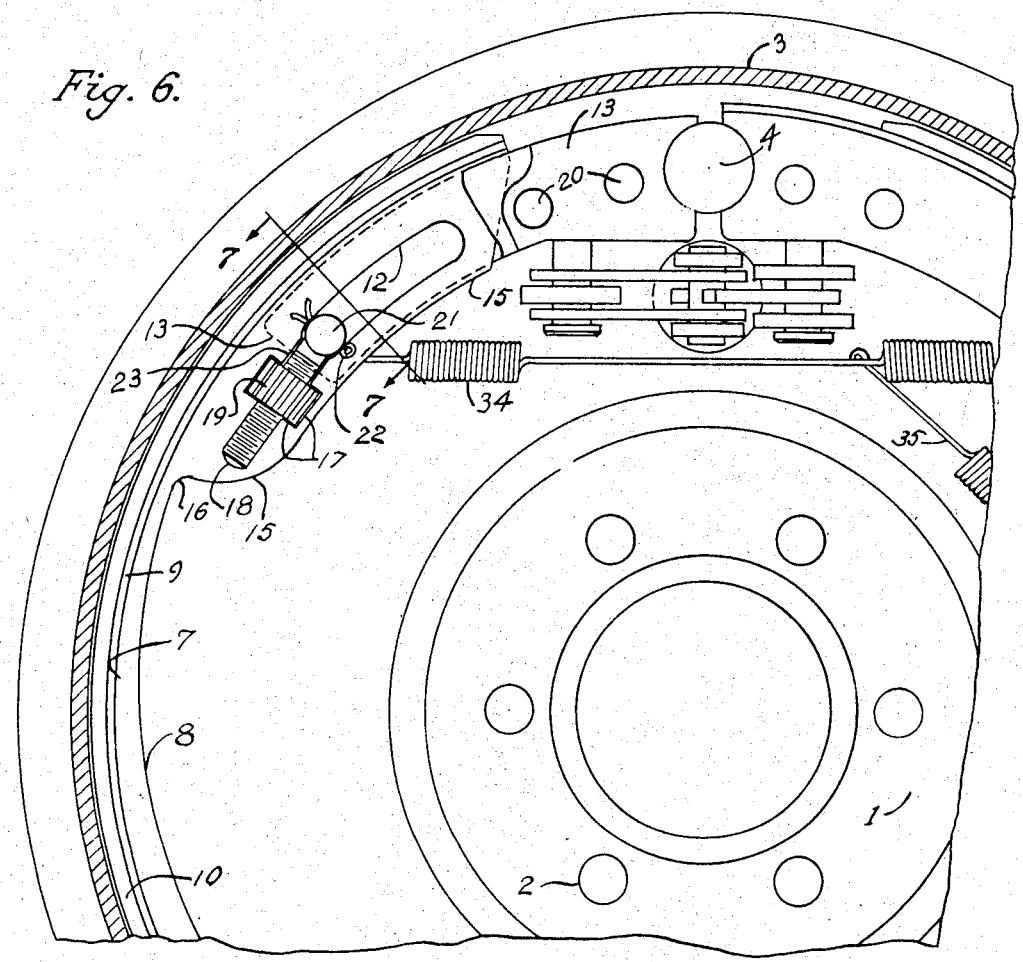
Figure 7:
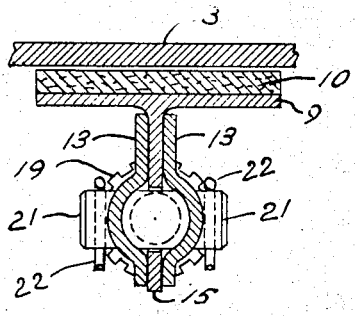
Figure 8:
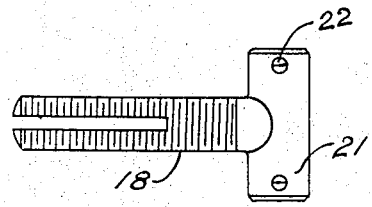

Figure 1 is a vertical section through the brake assembly; Fig. 2, a vertical section taken on the line 2—2, Fig. 1; Fig. 3, a horizontal section taken on the line 3—3, Fig. 2, disclosing the hydraulic piston and toggle members at the beginning of their movements; Fig. 4, a horizontal section through the hydraulic cylinder and toggle members, similar to the section of Fig. 3, except that the hydraulic piston and the toggle members are disclosed at the end of their movements; Fig. 5, a vertical section through the hydraulic cylinder and toggle members taken on the line 5—5, Fig. 2; Fig. 6, a partial vertical section taken on the line 2—2, Fig. 1, said section being illustrated in detail on a larger scale than that of Fig. 2; Fig. 7, a sectional view taken on the line 7—7, Fig. 6; and Fig. 8, a view of one of the threaded adjusting members.

Similar numerals refer to similar parts throughout the several views.

The backing plate 1 of the brake assembly is suitably attached, through the holes 2, to the axle assembly (not shown) of an automotive vehicle and the brake drum 3 is suitably attached to the revolving wheel assembly (not shown) of an automotive vehicle.

The anchor pin 4 extends through the backing plate 1 and is suitably attached thereto by its inner end being riveted over the spacer 5 and the washer 6.

The brake shoe 7 is constructed of a T shaped section having the web 8 extending vertically from the web 9 extending horizontally to form the base of the T shaped section. It is to be noted that brake shoe 7 has a cross section that decreases in area from approximately one of its ends to a point 16 near the other of its ends, the vertical height of the web 8 being gradually decreased to accomplish this feature. Thus it will be noted that the brake shoe 7 extends practically around the inside of the brake drum 3 and will have its varying cross sectional area so distributed as to cause the brake shoe 7 to always form a circle throughout its brake operating movement as well as to cause the brake shoe to exert equal pressures of the brake lining 10 throughout its circumferential area against the inside of the brake drum 3.

The brake shoe 7 is provided with a semi-circular surface 11 at its upper end to engage the anchor pin 4 to prevent the brake shoe 7 from moving circumferentially around the brake drum 3, the brake shoe 7 however being allowed to expand radially throughout its length to cause the brake lining 10 to engage the inside of the brake drum 3.

One end of the web of the brake shoe 7 is provided with the extension portion 15, to permit the member 13 to be suitably fastened between the end of the brake shoe 7 and the anchor pin 4 as hereinafter disclosed, the member 13 being suitably provided with semi-circular surfaces 14 at its upper end to engage the anchor pin 4 to prevent the brake shoe 7 from moving circumferentially around the brake drum 3, the brake shoe 7 however being allowed to expand radially throughout its length to cause the brake lining 10 to engage the inside of the brake drum 3.

The web 8 of the brake shoe 7 is provided with the extension portion 15 extending from one of its ends to a point adjacent the point 16, the web 8 being provided with the opening 17 therethrough. The threaded member 18 is provided with a slot in which extends the extension portion 15 of the web 8, the extension portion 8 thus restraining the threaded member 18 from turning when the adjusting nut 19 is revolved for adjusting the brake shoe 7, the threaded member 18 extending within and through the opening 17 of the extension portion 15.

It is to be noted that the member 13 is constructed of two portions held together by the rivets 20, the two portions fitting on each side of the extension portion 15 and slidably engaging said extension portion 15.

The member 13 is disclosed as being partially broken away to show a slot 12 in the extension portion 15 in which moves the head 21 of the threaded member 18, the head 21 of the threaded member 18 extending transversely through each of the two portions of the member 13 on each side of the extension portion 15 of the web 8, the cotter pins 22 tending to maintain the two portions of the member 13 in sliding engagement with the extension portion 15. The extension portion 15 of the web 8 is further provided with the opening 23, which connects with the openings 12 and 17, the threaded member 18 extending within the opening 23. It will thus be noted that when the adjusting nut 19 is adjustably turned, the brake shoe 7 may be expanded in relation to the member 13.

The double spring 34 is connected at its ends to the ends of the brake shoe 7 and tends to always maintain the semi-circular surfaces 11 and 14 in engagement with the anchor pin 4. The spring 35 is connected, at one of its ends, to the brake shoe 7 and, at its other end, to the spring 34, thus tending to unbalance the total spring tension on the ends of the brake shoe 7, relative to the anchor pin 4, thus further causing the end of the brake shoe, to which the member 13 is connected, to actuate its portion of attached brake lining into engagement with the brake drum 3 with greater pressure when the brake drum 3 is revolving, as indicated by the arrow in Fig. 2, than the engagement pressure of the other portions of the brake shoe 7, the said arrow indicating the direction of rotation of the brake drum 3 when the automotive vehicle is moving in a forwardly direction. This greater pressure of engagement of the brake shoe 7 at its forwardly side, when the vehicle is moving in a forwardly direction, as indicated by the arrow of rotation of the brake drum 3, will provide a servo-action of the brake mechanism during the forwardly direction of movement of the vehicle which constitutes the greater portion of movement of any vehicle.

The springs 36 are suitably attached to the brake shoe 7 and to the backing plate 1 at the lower side of the brake mechanism to provide for a suitable release movement of the brake shoe 7 from its brake lining engagement with the brake drum 3.

To the respective ends of the brake shoe 7 are suitably attached the pins 36 and 37 which are respectively provided with the shoulders 38. The toggle member 40 is pivotally mounted on the pin 37, between the rollers 39, and is provided with the jaws 41 and 42 together with the semi-circular surface 43 therebetween, the semi-circular surface 43 pivotally engaging the toggle pin 44 which is provided with the shoulders 45. The jaw 42 has a longer length than the jaw 41 to prevent disengagement with the toggle pin 44 when the toggle member 40 is in an extreme angular position relative to an extended center line through the vertical centers of the pins 36 and 37.

The toggle members 46 and 47 are pivotally mounted on the pin 36 and on the toggle pin 44. The toggle members 46 and 47 are mounted on the toggle pin 44 at each side of the toggle member 40, and the toggle members 46 and 47 are mounted on the pin 36 on each side of the roller 90.

The rollers 90 and 39 engage the backing plate 1 and absorb the thrust load due to the operation of the brake shoe 7, as hereinafter disclosed, at the same time allowing the brake shoe 7 to move radially in its expanding movement, without undue frictional resistance from engaging the backing plate 1.

The links 48 and 49 are pivotally mounted on the toggle pin 44, adjacent its shoulders 45, and pivotally engage the cylindrical ends 50 and 51 of the swivel nut 52 which extends between the links 48 and 49, the swivel nut 52 being provided with threads for engaging the rod 53 which may, if desired, be formed integral with the piston 54.

The backing plate 1 is provided with an opening for receiving the pilot member 55 which is provided with the cylindrical portion 56 which fits within a recess of the hydraulic cylinder or hydraulic cylinder housing 57, thus locating the hydraulic cylinder 57 when fastened in position by the screws 58 passing through the backing plate 1 and engaging suitable threaded portions of the bases 61 of the hydraulic cylinder 57.

The gasket member 59 is clamped between the inner face, of the cylindrical portion 56 of the pilot member 55, and a similar face of the hydraulic cylinder 57 to prevent leakage out of the hydraulic cylinder 57. It is to be noted there exists a clearance space between the inside face of the hydraulic cylinder 57 and the face of the supporting portion of the backing plate 1 to permit the hydraulic cylinder 57 to securely clamp the gasket member 59 when the hydraulic cylinder 57 is fastened in its assembled position on the backing plate 1.

The cylindrical portion 56 of the pilot member 55 is provided with the sealing member 60 which is vulcanized to the face of the cylindrical portion 56. The sealing member 60 is preferably constructed of molded rubber composition to a suitable frusto-conical shape which will permit its free end to resiliently press against the rod 53 of the piston 54 thus preventing leakage of the hydraulic liquid through the sealing member 60 or the pilot member 55 through which the rod 53 slidably operates.

The sealing element 60 together with a member similar to the cylindrical portion 56, to which said sealing element is vulcanized was disclosed and formed a portion of my original patent application, for a Brake, Serial No. 465,856, filed July 7, 1930, which is now Patent No. 1,996,444 issued April 2, 1935.

The piston 54 is provided with a shouldered portion 62 together with an undercut portion 63 therebetween. The sealing member 64 is preferably constructed of molded rubber composition to a suitable frusto-conical shape which will permit its free end to resiliently press against the inside wall of the bore 65 of the hydraulic cylinder 57 thus preventing the leakage of hydraulic liquid by the piston 54 or the sealing member 64 as the piston 54 slidably operates in the bore 65.

The sealing element 64 is vulcanized to the inner face of the piston 54 and to the surfaces of the undercut portion 63.

The sealing element 64 is similar to the sealing element disclosed in and forming a portion of my original patent application for a Hydraulic jack, Serial No. 464,869, filed June 30, 1930, which is now Patent No. 2,074,763 issued March 23, 1937.

The hydraulic cylinder 57 is provided with a threaded hole 66 for attaching the member 87 together with the hydraulic brake conduit 88 for conducting hydraulic liquid under pressure in a hydraulic brake system. The threaded hole 66 is connected with the bore 65 of the hydraulic cylinder 57 by the passages 67 and 68, the passage 68 delivering the hydraulic liquid under pressure into the bore 65 at a point between the sealing members 60 and 64.

In order to facilitate the manufacture of the hydraulic cylinder 15, the bore 65 may be machined through the hydraulic cylinder 57, the outer end of the bore being closed by the plug 77 being forced into its closure position against the shoulder 78. The plug 77 is provided with the vent hole 69 to prevent the cylinder space from becoming air bound.

The hydraulic cylinder 57 is further provided with the boss 70 in which is mounted the filling device assembly A which is similar to that disclosed in my patent application for Brakes, Serial No. 492,901, filed Nov. 3, 1930 which was refiled as application Serial No. 86,068 on which Patent No. 2,064,573 issued on December 15, 1936. The filling device assembly A comprises the threaded member 71 which engages the threaded chamber 72, the threaded member 71 being provided with the recess 73 in which is slidably mounted the member 74 provided with the recess 75 in which operates the spring 76. The passage 79 connects the threaded chamber 72 with the bore 65 at a point between the sealing members 60 and 64, the upper end of the passage 79 being provided with a valve seat portion which is engaged by the conical portion 80 of the member 74, the spring 76 always tending to maintain the conical portion 80 in engagement with the valve seat portion of the passage 79. The member 74 is provided with the passage 81 which connects the recess 75 of the member 74 with the chamber 82 below the threaded member 71.

The washer 83 is mounted in a position for being clamped between the upper end of the member 74 and the shoulder at the upper end of the recess 73 in the threaded member 71, the washer 83 being provided with the hole 84 which thus connects the recess 75 of the member 74 with the passage 85 in the upper end of which is mounted the threaded member 86.

In operation, the member 87 for connecting the hydraulic brake conduit 88 of the hydraulic brake system of an automotive vehicle with the wheel cylinder is attached in the threaded hole 66, the hydraulic brake system for developing hydraulic pressures in the hydraulic brake conduit 88 sufficient to actuate the brakes as hereinafter disclosed. As the hydraulic liquid under the necessary developed pressure is forced through the hydraulic brake conduit 88 and connection 87, it flows through the passages 67 and 68 into the bore 65, at a point between the sealing members 60 and 64, thus causing the piston 54 and its sealing member 64 to slidably move, away from the brake shoe 7, along the bore 65, thus causing the rod 53, the swivel nut 50, the links 48 and 49, and the toggle pin 44 to move the toggle members 40, 46, and 47 toward the backing plate 1, this movement of the toggle members 40, 46, and 47 moving the brake shoe 7 outwardly to cause the brake lining 10 to engage the brake drum 3 with great pressure.

It is to be noted that the filling device A is disclosed in its closed position with the threaded member 71, the member 74, and washer 83 all forced tight together by the threaded member 71, this causing the conical portion 80 of the member 74 to engage the valve seat portion at the end of the passage 79 to prevent any escape of the hydraulic liquid when operating the brake mechanism.

When it is desired to fill the hydraulic system operating the wheel brake mechanism, the threaded member 71 is screwed out so that the shoulder at the upper end of the recess 73 will be free of the washer 83, the washer 83 only loosely engaging the upper end of the member 74, thus allowing the conical portion 80 of the member 74 to be maintained in engagement with its valve seat by the pressure only of the spring 76. A suitable drain connection is now attached to the threaded portion at the end of the passage 85, the threaded plug 86 having been removed. The lower end of drain connection may be placed in a suitable container for containing a surplus of hydraulic liquid. It will now be noted that with the filling device in an open position, as above described, and with the hydraulic liquid being forced, by suitable means through the conduit 88, the connection 87, the passages 67 and 68, the hydraulic liquid will be forced through the bore 65, between the sealing members 60 and 64, through the passage 79, and against the conical end 80 of the member 74, the force of the hydraulic liquid raising the member 74 from its seat by compressing the spring 76. Thus the hydraulic liquid will flow into the chamber 82, through the passage 81, the recess 75, the hole 84 of the washer 83, and through the threaded passage 85 into the connection and drain tube, that has been attached to the threaded portion at the upper end of the passage 85, into the container in which the drain tube may be placed. As the hydraulic liquid is forced through and out of the filling device A, as above described, any air that may be present in that portion of the hydraulic brake system leading to the wheel hydraulic cylinder will be forced out.

It is to be noted that immediately the pressure is removed from the hydraulic liquid which has raised the member 74 from its valve seat, the spring 76 will automatically cause the member 74 to resume its closed position on the valve seat, thus preventing any air from flowing into the hydraulic system through the filling device A.

As soon as all the air has been removed from the brake system, the drain tube and its connection will be removed and the threaded member 86 replaced in its position as shown in Fig. 5. Then the filling device A is returned to its closed position, as above disclosed, by threading the member 71 into the boss 70 where it will force the member 74 and the washer 83 together, thus causing the member 74 to close the passages through the filling device A and preventing the escape of any hydraulic liquid when the hydraulic brake system is used. A spring 91 is interposed between the portion 56 and the shoulder 62 to take up any slack in the brake actuating mechanism.

I claim:

1. In a brake, the combination of a brake drum, a brake support member, a single brake shoe in said brake drum, a fixed anchor between the ends of said single brake shoe, said fixed anchor being connected with said brake support member, toggle members pivotally connected to the ends of said brake shoe, a pair of links pivotally connected to said toggle members, a member pivotally mounted in said pair of link members, a hydraulic cylinder suitably mounted on said brake support member, said hydraulic cylinder extending in a plane substantially parallel with the axis of said brake drum, a piston slidably mounted in said hydraulic cylinder, means connecting said piston with said member pivotally mounted in said pair of link members, said means extending through said brake support member, means for receiving hydraulic pressure to move said piston away from said brake shoe, and means for adjusting said brake shoe relative to said brake drum.

2. In a brake, the combination of a backing plate suitably mounted, a brake drum suitably mounted, a brake shoe suitably mounted on said backing plate and adapted to move to engage said brake drum, a hydraulic cylinder mounted on said backing plate on the opposite side thereof relative to said brake shoe, a piston movably mounted in said hydraulic cylinder and provided with a rod extending through said backing plate, a swivel nut threaded on said rod of said piston and provided with a pair of cylindrical ends, a pair of links pivotally connected with said cylindrical ends of swivel nut, toggle members pivotally connected with said pair of links and with the ends of said brake shoe, and means for hydraulically actuating said piston in a direction away from said backing plate to operate said brake shoe to engage said drum.

3. In a brake mechanism a hydraulically operated piston having a rod member, a brake shoe connected therewith, and means for connecting said piston and said shoe comprising a swivel nut suitably mounted on the rod member of said piston and provided with oppositely disposed cylindrical ends, link members pivotally engaging the oppositely disposed cylindrical ends of said swivel nut, and toggle means pivotally connected with said link members and said brake shoe.

JOHN W. TATTER.